Figure 1:
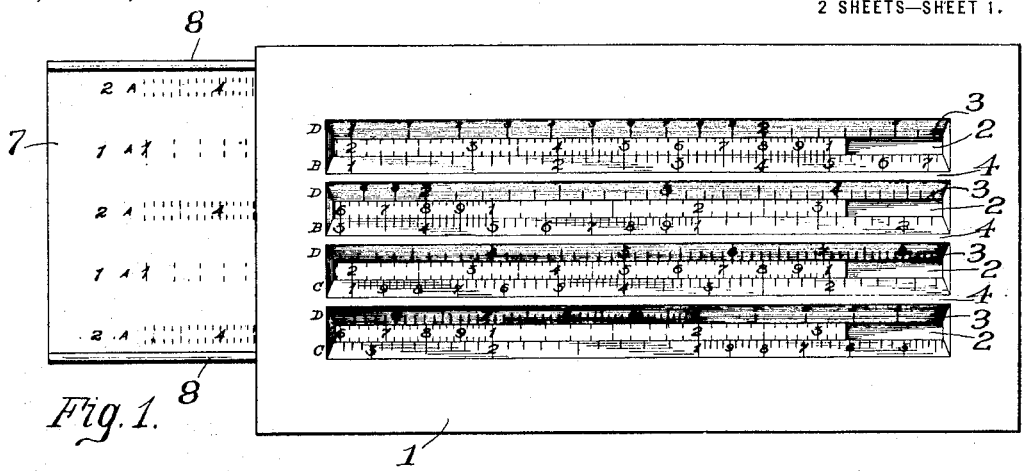

H. OBERG.
COMPUTING DEVICE.
APPLICATION FILED SEPT. 25, 1914.

1,153,565.

Patented Sept. 14, 1915.

2 SHEETS—SHEET 1.

WITNESSES:
M. C. Penfield.
M. J. Longden.

INVENTOR
Henry Oberg.
By
J. O. Smith.
ATTORNEY

H. OBERG.
COMPUTING DEVICE.
APPLICATION FILED SEPT. 25, 1914.

1,153,565.

Patented Sept. 14, 1915.
2 SHEETS—SHEET 2.

WITNESSES:
M. C. Penfield.
M. J. Longden.

INVENTOR
Henry Oberg
By
ATTORNEY

UNITED STATES PATENT OFFICE.

HENRY OBERG, OF BRIDGEPORT, CONNECTICUT.

COMPUTING DEVICE.

1,153,565.   Specification of Letters Patent.   Patented Sept. 14, 1915.

Application filed September 25, 1914. Serial No. 863,509.

*To all whom it may concern:*

Be it known that I, HENRY OBERG, a subject of the King of Sweden, residing in the city of Bridgeport, county of Fairfield, State of Connecticut, United States of America, have invented certain new and useful Improvements in Computing Devices; and I do declare the following to be a full, clear, and exact description of the invention, such as will enable others skilled in the art to which it appertains to make and use the same.

My invention has reference to certain improvements in computing devices of the slide rule character, and has for its object to provide a rule simple in construction and of great efficiency and accuracy.

In the well known Mannheim rule the logarithmic scales are arranged in one continuous line, and the length of the scales is limited by the length of the rule, but in my present improvement the logarithmic scales are split up into a series of parallel longitudinal lines arranged on the margins of longitudinal sight openings in the body member and also arranged on a member slidable in the body member, all readings on both the body and slide members being viewed in substantially the same horizontal plane.

In accordance with my present invention the rule comprises a body member and a slide, or, in some instances, more than one slide, but the slide is not only capable of movements lengthwise of the rule, but may be reversed or may be adjusted laterally of the length of the rule, while the latter is provided with a correspondingly enlarged number of scales.

In my invention a rule of a certain length provides for calculations heretofore necessitating a rule of much greater length, and accordingly I materially decrease the liability of warping and also the cost of production. Also, in my rule, riders are wholly unnecessary.

In my improvement any desired number on one member may be compared with any desired number on the other member by relatively lateral or longitudinal adjustments, and to avoid too many lateral adjustments both sides of the slide member may be utilized.

When only a few sight openings are used and the progressive lines of the logarithmic scale are extended or elongated on one or both members, lateral adjustment is unnecessary, and a reversal of the slide may take the place of such lateral adjustment. The reversal of the slide is utilized in the Mannheim rule, but the logarithmic scales on the reverse side are of different character from those on the other or obverse side.

My invention will be best understood from a reading of the following detail description taken in connection with the accompanying drawing forming a part of this specification, with the further understanding, that, while the drawings show practical forms of the invention, other practical forms may be assumed, wherefore the invention is not confined to any strict conformity with the showing of the drawings but may be changed and modified so long as such changes and modifications mark no material departure from the salient features of the invention.

Figure 2:
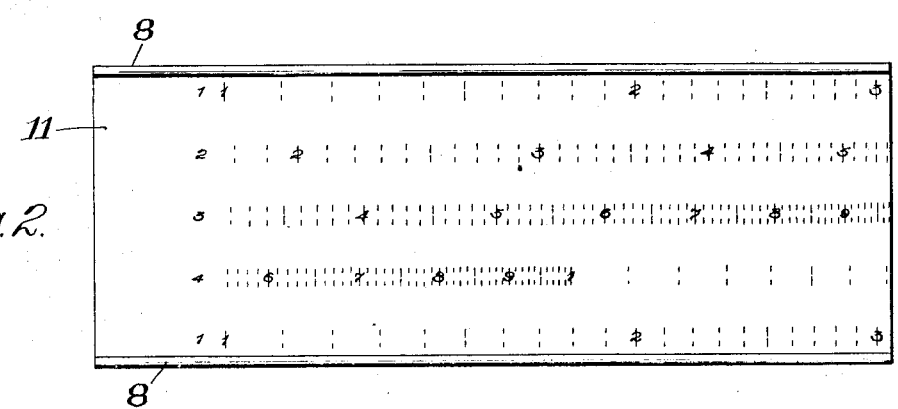
Figure 3:
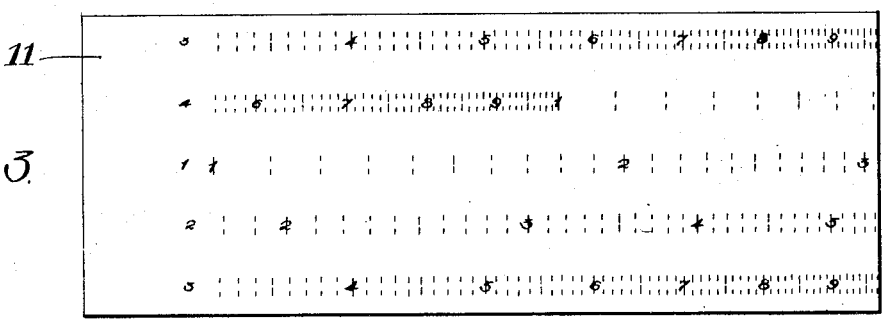
Figure 4:
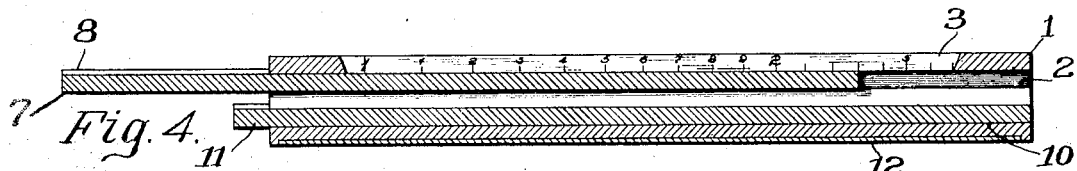
Figure 5:
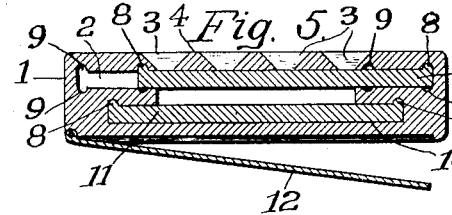
Figure 6:
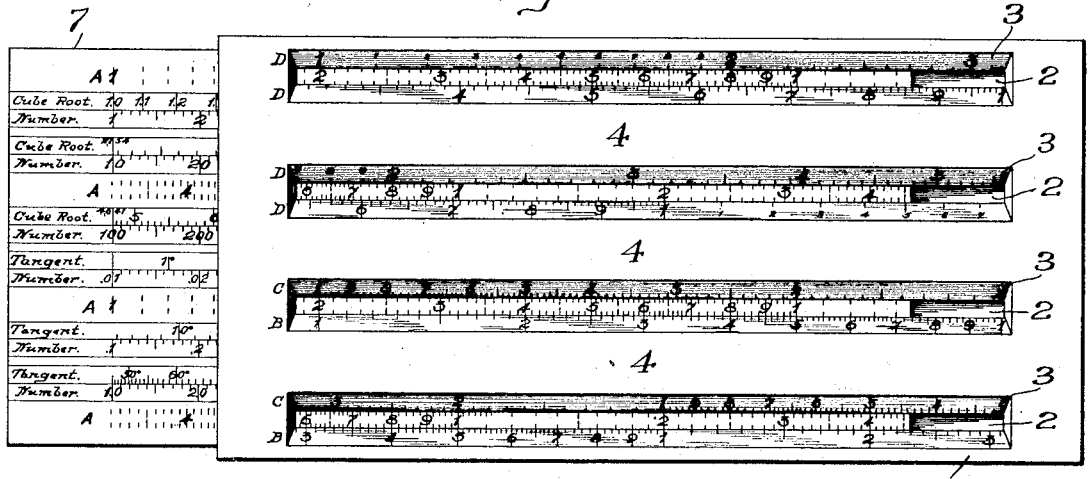
Figure 7:
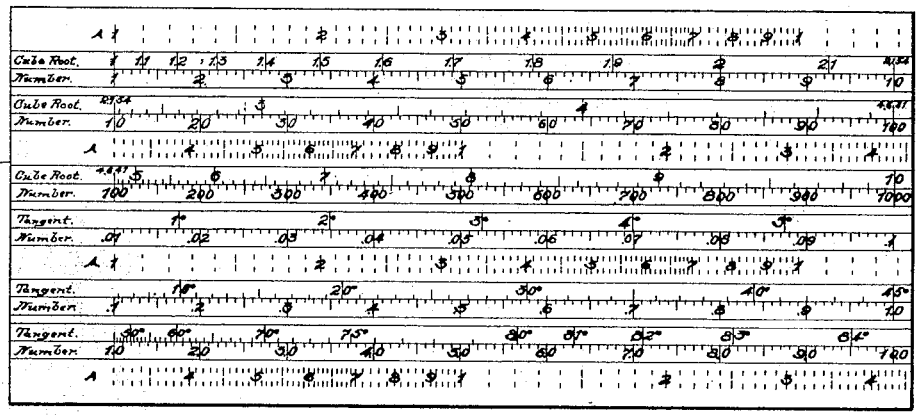
Figure 8:
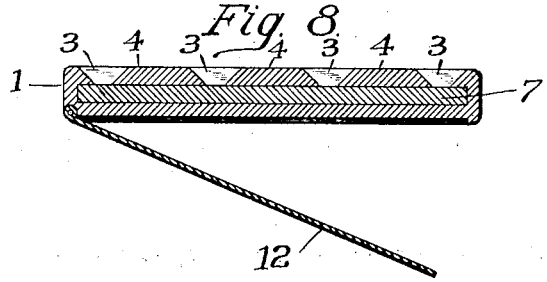

In the drawing Figure 1 is a plan view of a slide rule embodying my invention. Figs. 2 and 3 are respectively plan views of the obverse and reverse faces of a modified form of slide which may be employed in connection with the structure shown at Fig. 1. Fig. 4 is a longitudinally substantially central section through the slide rule shown at Fig. 1. Fig. 5 is a cross section of the structure shown at Fig. 1. Fig. 6 is a view similar to Fig. 1, but showing an embodiment of my invention in which lateral adjustment is unnecessary. Fig. 7 is a plan view of the slide used in the construction shown at Fig. 6, and Fig. 8 is a cross section of the structure shown at Fig. 6.

Similar numerals of reference denote like parts in the several figures of the drawing.

Referring to the drawings, there is shown a body member 1 which may be made of any suitable material, either wood or metal, or of some other material, and in the smaller sizes this member may be made of aluminum thereby providing a cheap and very light construction. This body member is composed of a single piece of material of proper form, but it will be understood that as many separate pieces may be employed as may be found necessary, and these pieces may be united in any suitable manner in accordance with the character of the material employed. This body member 1 is made hollow with a channel 2 extending throughout its length and open at the ends and somewhat less in width than the width of the body member, the length of which latter is usually greater than the width, while the thickness is only about the same as the thickness of the commercial form of slide rules. In one face of the body member there is provided a series of elongated slots 3 which provide sight openings into the channel 2 and these slots are separated by partitions 4 extending lengthwise of the portion of the body member in which such slots are formed. On the marginal portions of these sight openings 3 scales are provided which will be referred to hereinafter. Adapted to the channel 2 is a slide member 7 which may have a length usually equal to, but if preferred, greater than, that of the body member. This slide is preferably of less width than the width of the channel 2 and may be made to fit the channel so that it will, frictionally or otherwise, retain any position in which it may be adjusted in the body member against liability of accidental displacement.

At the margins of the sides of the slide are ribs or flanges 8 adapted to the grooves 9 at the side edges of the channel 2 and at intermediate points, these ribs being usually provided in pairs extending oppositely from the channel 2 into the body member. The grooves 9 are so related that when a rib 8 along one edge of the slide is in a groove 9 at the corresponding edge of the channel 2 the rib 8 along the other edge of the slide is in a groove 9 near to but spaced from the other edge of the channel 2. The grooves 9 are so related and the width of the slide to the width of the channel 2 is likewise so related, that the slide may be moved lengthwise of the body 1 in either one or more than one position with respect to the lateral relation of the slide and the body member, or, such slide may be reversed to expose the reverse face thereof. In the drawing, two such positions of lateral adjustment are shown, in either of which the slide is positively guided lengthwise of the body member, by the engagement of the ribs 8 in the respective grooves 9, but in all instances the slide may be reversed, if desired, so as to expose the scales carried by the reverse side. Under some circumstances a greater number of grooves 9 may be employed and a correspondingly greater field of lateral adjustments of the slide provided for. Produced upon the slide are scales which are viewed through the sight openings 3.

For further enlarging the usefulness of the rule, more than one slide may be provided, in which case an extra channel 10 is formed in the body member below the channel 2 in which to store the other slide 11 when not in use, and when the scale as a whole is not in use one slide may be stored in the channel 10 and the other slide in the channel 2. At Figs. 2 and 3 I have shown such extra slide in obverse and reverse, and it will be clear that, by producing the scales on both sides of this slide, the latter may be reversed so as to bring any of the scales into sight through the openings 3 and in proper relation to the scales along the edges of these openings.

By the arrangement of the logarithmic scales split into a series of progressive parallel lines or rows, and by associating therewith a slide capable of longitudinal and transverse adjustments and also of reversal, it is possible to get a logarithmic scale several times longer and more comprehensive than in prior forms of rules of this character, and the scope of the logarithmic scale is readily increased by increasing the number of lines.

In Figs. 1 and 6 there are shown arrangements of scales, in accordance with my improvement, for the working out of general formulas. To solve these formulas in one setting, there must be a logarithmic scale of numbers relatively adjustable to other logarithmic scales of square roots, numbers and reciprocals, and to accomplish this there is provided a logarithmic scale twice as long as the others, which scale is designated in Figs. 1 and 6 by the letter D, this scale taking up one-half the graduated length of the scale surfaces of the body member 1 or four lines when eight lines are employed. Another scale reads from left to right and is marked B, the readings of the scales B and D being the same in direction. The scale B is only one-half the length of the scale D, or two lines long, while the remaining two lines of the eight line scale are designated by C and are equal in length to the scale B but read from right to left, that is, this scale is a scale of reciprocals. When such scales are arranged on the body member the slide has logarithmic scales reading from left to right. Other arrangements of the scales may be employed but generally the ones described are the most used.

I would call attention to two formulas as general examples, together with the rules under which they are worked—

*No. 1.*

$\dfrac{ax}{b}, \dfrac{ax^2}{b}, \dfrac{ax}{b^2}, \dfrac{ax^2}{b^2}$, slide direct.

$\dfrac{ba}{x}, \dfrac{b^2a}{x}, \dfrac{ba}{x^2}, \dfrac{b^2a}{x^2}$, slide reversed.

Rule: Opposite $b$ on B, if first power, or D, if second power, set $a$ on A. Then opposite $x$ on B, if first power, and D, if second power, find answer on A.

*No. 2.*

$cax$ and $cax^2$, slide direct.

Rule: Opposite $c$ on C set $a$ on A. Then opposite $x$ on B, if first power, or D, if second power, find answer on A.

These two formulas are solved by following the rules. In these formulas $a$, $b$, and $c$, may have any desired value, but it is, of course, necessary to set the slide whenever their values are changed. $x$ is not used in setting and may have any number of values without resetting.

It will be observed that on Fig. 1 the slide is drawn out to the left so that "2" on A is opposite "1" on B, and the above formulas are solved by the rules noted as follows:

*First formula.*

$$\frac{ax}{b} = \frac{2 \times 4}{1} = 8.0, \quad \frac{1 \times 20}{5} = 4.0, \quad \frac{6 \times 9}{3} = 18.0, \&c.$$

$$\frac{ax^2}{b} = \frac{6 \times 4^2}{3} = 32.0, \quad \frac{1 \times 6^2}{5} = 7.2, \&c.$$

$$\frac{ax}{b^2} = \frac{3.2 \times 8.0}{4^2} = 1.6, \quad \frac{8.0 \times 6.0}{2^2} = 12.0, \&c.$$

$$\frac{ax^2}{b^2} = \frac{7.2 \times 4^2}{6^2} = 3.2, \quad \frac{3.2 \times 20^2}{4^2} = 80.0, \&c.$$

*Second formula.*

$$cax = 5 \times 4 \times 3 = 60.0, \quad cax^2 = 5 \times 4 \times 4^2 = 320.0.$$

One feature of the present invention is, that, in the arrangement of the scales in progressive series of parallel lines, all viewed in substantially the same horizontal plane, every arrangement heretofore used in connection with the Mannheim type may be employed.

While certain scales are shown on the body member and others on the slides, it will be understood that the reverse arrangement may be used, that is the scales shown on the body member may be on the slides and those on the slides may be on the body member.

The object of the transverse adjustments of the slide 7 is to put into use the slide scales that are designated at Fig. 1 and reading from the top, 2, 1, 2, 1, which would throw the bottom scale out of use, and therefore it will be clear, that, by placing these scales on the back of the slide I can merely reverse the slide and obtain the results desired equally as well as by transversely shifting such slide, and therefore I do not wish to be limited in this respect.

Referring to Figs. 6 and 7, I will call attention to the fact that my improvement is capable of uses not common to the Mannheim rule, since, by laying out, either separately or intermediate of the scales A, additional scales designating mathematical functions such as roots or powers, or trigonometric functions, said scales split into series of progressive lines, while in juxtaposition to these additional scales are scales denoting numerical values and likewise split into series of progressive lines, the scales designating the mathematical functions are graphically compared with their numerical values so that I am enabled to materially add to the efficiency of my scale.

In order to carry the various tables, formulas, &c., necessary in utilizing my improvements, I provide a back flap 12, both sides of which may be used, if desired.

Having thus described my invention what I claim as new and desire to secure by Letters Patent is:—

1. A computing device having one flat member with logarithmic scales split up in a series of progressive parallel lines thereon and another flat member also having logarithmic scales split up in a series of progressive parallel lines thereon and movable longitudinally and adjustable transversely of the other member, the two members being in substantially the same plane so as to be viewed simultaneously and also coactively arranged as against relative transverse movement while being relatively adjusted longitudinally.

2. A computing device, comprising a flat body member having parallel elongated sight openings in substantially the same plane and whose margins provide scale lines that have logarithmic scales split into progressive lines, there being three scales two of which are of equal length while the third scale is equal in length to the other two, said third scale having four sections while the other two scales each have two sections, the four sections of the third scale alternating with the two sections of the other scales, and another flat member adjustable within said body member and having logarithmic scales also split into a series of progressive lines and simultaneously readable through said openings.

3. A computing device consisting of an elongated and substantially flat body member provided with a lateral spaced series of longitudinal sight openings having logarithmic scales split up in a series of progressive lines at the margins thereof, and a substantially flat slide movable longitudinally through the body member and visible through the sight openings, said slide being also adjustable transversely of the body member and provided with logarithmic scales split up in a series of progressive lines and disposed in a plurality of parallel lines exceeding in number the number of sight openings in the series thereof in the body member and less than the whole number of parallel lines of scales in view at any one time through the sight openings.

4. A computing device comprising a body member having thereon a plurality of laterally disposed associated logarithmic scales split up in a series of progressive lines, and a slide also having thereon a plurality of laterally disposed logarithmic scales split into a series of progressive lines and movable longitudinally and adjustable transversely of the body member, said slide and body members being coactively arranged to hold the slide against transverse movement while being moved longitudinally and to present a plurality of the same scales on the slide in operative relation to the scales of the body member in different transverse adjustments of the slide.

5. A computing device comprising a body member having a longitudinal channel therethrough with sight openings at the surface of the body member communicating with the channel, said channel being open at the ends and provided with laterally displaced sets of marginally located and substantially identical guide means, and a slide provided with guiding means adapted to any set of guiding means in the channel of the body member, the guiding means so constructed as to permit the slide to be moved in the same direction through the channel in any set of guide means, the body member and slide being provided with coöperating scales.

6. A computing device comprising a body member and a slide, the latter being reversible and movable with relation to the body member both longitudinally and transversely thereof with either face presented to view.

7. A computing device comprising a body member with a plurality of longitudinal sight openings therein and having scales at the margins of the sight openings and a slide movable with relation to the sight openings both longitudinally and transversely of the body member, said body member and slide being provided with a plurality of coacting tongue and groove guiding means for holding the slide in different positions of transverse relation to the body member and at the same time permitting longitudinal movement of the slide.

8. A computing device comprising a relatively flat body member having a plurality of longitudinal sight openings in one face thereof with logarithmic scales split up in a series of progressive lines at the margins of the openings, and a relatively flat slide movable with relation to the body member both longitudinally and transversely thereof and also reversible with respect to the body member to present either face to view through the sight openings, said slide being provided on both faces with logarithmic scales split in a series of progressive parallel lines the number of lines on either face of the slide exceeding the number of sight openings on the one face of the body member and the parallel lines of scales on the slide being spaced apart the same as the sight openings of the body member and adapted to be viewed through the sight openings in different lateral adjustments of the slide.

9. A computing device having a body member with sight openings and scales split up in series of progressive parallel lines bordering said openings, and a slide with scales split up in series of progressive parallel lines and insertible into and movable along the body member in any of a plurality of positions transversely thereof, the number of parallel lines of scales on one face of the slide exceeding the number of sight openings of the body member.

10. A computing device having a body member with sight openings and scales bordering said openings, and a slide with scales in parallel lines, the body member being provided with a channel for the slide of greater width than the slide, and said slide and body member being coactively shaped to permit the slide to be inserted into the channel of the body member in any of a plurality of positions transverse thereof with the same face of the slide presented in the different positions of transverse adjustment.

11. A computing device comprising a body member having a longitudinal channel open at the ends, said channel being provided with laterally displaced sets of marginally located guiding means all common to the channel, and said body member having a plurality of sight openings extending to the channel, and a slide provided with marginal guiding means adapted to any set of guiding means in the channel of the body member, the channel in the body member being wider than the slide, and the guiding means in the body member and on the slide being coactively constructed to permit the presentation of either face of the slide to view through the sight openings of the body member with the guiding means of the slide in any one of the sets of guiding means of the body member.

12. A computing device, comprising a body member having parallel elongated sight openings whose margins have logarithmic scales B, C, and D split into progressive lines and readable respectively from left to right from right to left and from left to right, the scales B and C being of equal length while the scale D is equal in length to the other two scales, and another member slidable within said body member and also having sets of logarithmic scales split into a series of progressive lines and viewed through said sight openings, each of said sets being equal in length to the length of the scale B.

In testimony whereof I affix my signature in presence of two witnesses.

HENRY OBERG.

Witnesses:
F. W. SMITH, Jr.,
M. T. LONGDEN.